(No Model.)
J. A. EDWARDS & E. WALTON.
HORSE HAY RAKE.
No. 387,502. Patented Aug. 7, 1888.
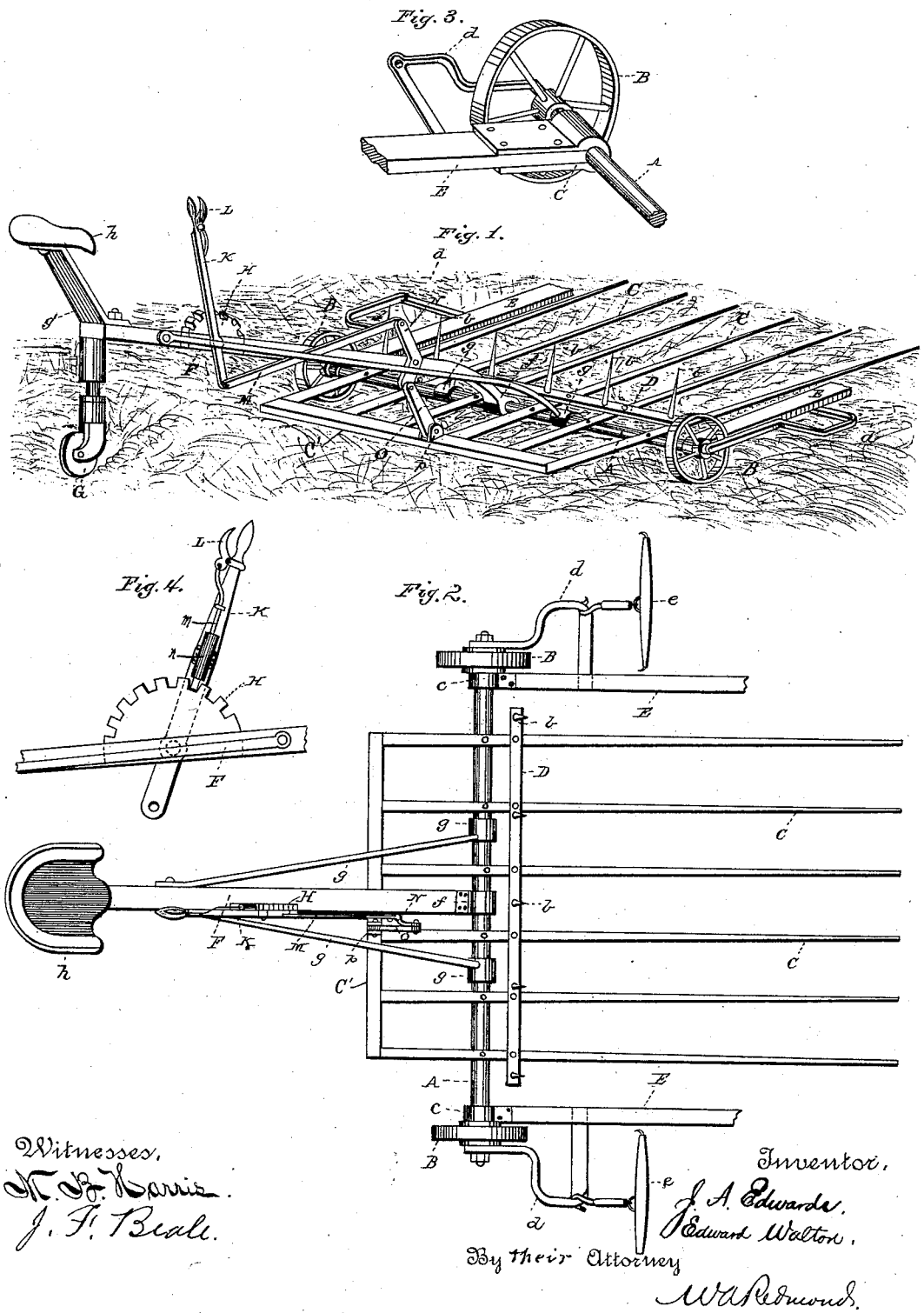

UNITED STATES PATENT OFFICE.

JOSEPH A. EDWARDS AND EDWARD WALTON, OF CHARITON, IOWA, ASSIGNORS OF ONE-THIRD TO DAVID WORMLEY, OF SAME PLACE.

HORSE HAY-RAKE.

SPECIFICATION forming part of Letters Patent No. 387,502, dated August 7, 1888.

Application filed November 2, 1887. Serial No. 254,113. (No model.)

*To all whom it may concern:*

Be it known that we, JOSEPH A. EDWARDS and EDWARD WALTON, citizens of the United States, residing at Chariton, in the county of Lucas and State of Iowa, have invented certain new and useful Improvements in Hay-Rakes; and we do hereby declare the following to be a full, clear, and exact description of the invention, such as will enable others skilled in the art to which it appertains to make and use the same.

This invention relates to that class of machines for gathering hay known as horse hay "rakes" or "drags;" and it has for its object to provide a simple, durable, and easily-operated rake having its seat-beam and shafts pivotally attached to its axle, and improved means for elevating or lowering the teeth of the rake; and it consists of the parts and combinations of parts hereinafter described and claimed.

In the accompanying drawings, forming a part of this specification, Figure 1 is a perspective view of our improved rake; Fig. 2, a plan view; Fig. 3, a detail view of the connection between the axle and shafts, and Fig. 4 a detail view of the operating-lever.

Similar letters refer to similar parts throughout the views.

A represents the axle of our rake, having the wheels B journaled thereon in any desired manner. To the axle A the straight teeth C of the rake are secured rigidly by bolts or otherwise near their rear ends, and the rear ends of the rake-teeth are secured to a cross-bar, C'.

A bar, D, having a series of long teeth, $b$, slightly inclined forward, as shown in Fig. 2, for the purpose of better holding the hay when the rake is elevated, is rigidly secured by bolts to and across the rake-teeth near their rear end and just above and in front of the axle A.

At each end of the axle, alongside of the inner sides of the wheels, the shafts E are loosely attached by means of collars $c$, which permit of the shafts rising and falling with the motion of the horses. At the extreme outer ends of the axle the ends of angle-irons $d$ are loosely attached in any desired manner, so that they may turn thereon, and the other ends of said irons are rigidly secured to the under sides of the shafts by bolts or otherwise in front of the wheels. To these irons the singletrees $e$ are pivoted. Thus it will be seen that the horses are hooked to the rake outside of the shafts and walk on each side of the rake-teeth, and that the shafts and angle-irons may follow the motions of the horses in passing over rough ground without disturbing the angle of the rake-teeth. To the axle at its center the rear beam, F, is loosely attached by means of a collar, $f$, similar to the collar $c$ of the shafts, as are also the braces $g$, and the rear end of the beam is supported by a caster-wheel, G. From a suitable point on the rear beam the seat-bar $g'$ rises, which supports the seat $h$ for the driver. Immediately in front of the seat-bar on beam F a segmental ratchet, H, is secured, and to one side of the beam a lever, K, is pivoted.

To the lever K, near its upper end, a thumb-lever, L, is pivoted, and from this lever a pawl or pin, $m$, depends, working through and being guided by the eye $n$, secured to the lever K and adapted to enter the interdental spaces in ratchet H, to hold lever K when adjusted. At the lower end of lever K one end of a straight link or rod, M, is pivoted, its other end being pivoted to the upper end of an elbow-lever, N, above beam F, said lever N being pivoted to the beam F at the bend in or elbow of the same. To the other or lower end of lever N one end of a short link, O, is pivoted, the other end of this latter link being pivoted between ears $p$ on the cross-bar secured to the rear ends of the rake-teeth. The object of loosely attaching the rear beam and its braces to the axle by collars is to bring the bearing more to the center and permit of the elevation or lowering of the rake-teeth without affecting the front end of the beam—that is, causing the same to rise or fall with the adjustment of the teeth, as is the case when the beam is attached rigidly to the axle or to a bar secured to the rear end of the teeth, as is customary. By attaching the shafts to the axle by collars, they will follow every up and down movement of the horses when they are traveling on uneven ground or step in a hole without disturbing the angle of inclination of the teeth of the rake; also, the movement of one of the horses does not affect the other at all, and when crossing a ditch the teeth may be elevated as the horses step down, so that there will be no danger of running the teeth into the ground. The triple leverage enables the operator to raise the rake-teeth when loaded with hay with great ease.

Having thus described our invention, what we claim as new, and desire to secure by Letters Patent, is—

1. In a horse hay-rake, the combination of the axle, the shafts pivotally attached to said axle, the angle-irons having one end pivoted to the axle and the other rigidly attached to the shafts, the rake-teeth secured to said axle, the seat-supporting beam pivotally attached to the axle, the caster-wheel supporting said beam, and means for adjusting the inclination of the rake-teeth, substantially as described.

2. In a horse hay-rake, the combination of the axle A, shafts E, beam F, segmental ratchet H, secured to said beam, the lever K, pivoted to the beam, the link M, having one end pivoted to the lever K and the other to the elbow-lever N, the elbow-lever N, pivoted to the beam, the link O, pivoted at one end to the lever N and at its other to the cross-bar secured to the rear ends of the rake-teeth, and means for locking said levers in their adjusted position, substantially as described.

3. A horse hay-rake consisting of the axle A, the wheels B, the shafts E, the seat-supporting beams and braces loosely attached to said axle, the rake-teeth rigidly secured to the axle, the bar D, having the inclined teeth $b$, angle-irons $d$, rigidly secured at one end to the shafts and at the other loosely secured to the ends of the axle, caster-wheels G, the seat-bar G', secured to the supporting-beams, the seat $h$, the lever K, pivoted to the beam and carrying thumb-lever L, the latter having the depending pin $m$, the segmental ratchet H on the beam, the link M, pivoted to the lever and to bell-crank N, the bell-crank N, pivoted to the beam and its lower arm pivoted to the link O, and the link O, pivoted to the cross-bar secured to the rear ends of the rake-teeth, substantially as described.

In testimony whereof we affix our signatures in presence of two witnesses.

J. A. EDWARDS.
EDWARD WALTON.

Witnesses:
  N. B. GARDNER,
  S. D. HICKMAN.